US012412679B2

(12) United States Patent
Haehner et al.

(10) Patent No.: US 12,412,679 B2
(45) Date of Patent: Sep. 9, 2025

(54) ELECTRICAL CABLE FOR THE AEROSPACE FIELD

(71) Applicant: NEXANS, Courbevoie (FR)

(72) Inventors: Thomas Haehner, Verrieres-le Buisson (FR); Patrick Rybski, Yerres (FR); Dimitri Charrier, Ecully (FR); Adrien Charmetant, Meribel (FR); Clara Lagomarsini, Lyons (FR); Nabil Mellouky, Lyons (FR); Marcelo Paixao Dantas, Nuremberg (DE)

(73) Assignee: NEXANS, Courbevoie (FR)

(*) Notice: Subject to any disclaimer, the term of this patent is extended or adjusted under 35 U.S.C. 154(b) by 68 days.

(21) Appl. No.: 17/466,587

(22) Filed: Sep. 3, 2021

(65) Prior Publication Data

US 2022/0084718 A1 Mar. 17, 2022

(30) Foreign Application Priority Data

Sep. 4, 2020 (FR) ...................................... 20 08987

(51) Int. Cl.

| | |
|---|---|
| ***H01B 7/04*** | (2006.01) |
| ***H01B 3/00*** | (2006.01) |
| ***H01B 3/44*** | (2006.01) |
| ***H01B 7/02*** | (2006.01) |
| ***H01B 7/28*** | (2006.01) |
| ***H01B 9/02*** | (2006.01) |

(52) U.S. Cl.

CPC ............. *H01B 7/043* (2013.01); *H01B 3/445* (2013.01); *H01B 7/0258* (2013.01); *H01B 7/2806* (2013.01)

(58) Field of Classification Search

CPC .. H01B 7/2813; H01B 7/0291; H01B 7/2806; H01B 7/0258; H01B 7/043; H01B 3/004; H01B 3/445; H01B 9/027

See application file for complete search history.

(56) References Cited

U.S. PATENT DOCUMENTS

| | | | | |
|---|---|---|---|---|
| 9,362,019 | B2 * | 6/2016 | Janah | H01B 3/445 |
| 2011/0209895 | A1 | 9/2011 | Saito et al. | |
| 2013/0206452 | A1 * | 8/2013 | Janah | H01B 3/004 174/120 SC |
| 2014/0224521 | A1 * | 8/2014 | Janah | H01B 3/445 174/110 SR |
| 2017/0332444 | A1 * | 11/2017 | Dong | H05B 3/0004 |
| 2020/0051713 | A1 | 2/2020 | Kim et al. | |

OTHER PUBLICATIONS

KeHong Enterprises Co Ltd, “Calculation of Thickness of Cable Insulation Layer”, Jun. 12, 2019, pp. 1-2 htto:/Avww.heatshrinkstar.com/news/calculation-of-thickness-of-cable-insulation-I-24144765.html (Year: 2019) (Year: 2019).*

International Search Report dated May 6, 2021.

* cited by examiner

*Primary Examiner* — Hoa C Nguyen
*Assistant Examiner* — Amol H Patel
(74) *Attorney, Agent, or Firm* — Sofer & Haroun, LLP

(57) ABSTRACT

An insulated electrically conductive element (1) for the aerospace field has an elongate electrically conductive element surrounded by at least two layers, said two layers being an electrically insulating layer (4) surrounding the elongate electrically conductive element (2) and a first semiconductor layer (5) surrounding said electrically insulating layer (4), at least one of the layers having at least one fluoropolymer.

12 Claims, 4 Drawing Sheets

ELECTRICAL CABLE FOR THE AEROSPACE FIELD

RELATED APPLICATION

This application claims the benefit of priority from French Patent Application No. 20 08987, filed on Sep. 4, 2020, the entirety of which is incorporated by reference.

Field of the Invention

The present invention relates to an insulated electrically conductive element for the aerospace field and to an electrically conductive cable comprising such an element.

DESCRIPTION OF RELATED ART

Electrical cables generally comprise at least one electrically conductive element surrounded by at least one layer of an insulating material.

In the aerospace field, electrical cables must meet certain constraints and, in particular, exhibit low bulk and/or weight while still withstanding extreme temperatures which may range from −65° C. to 260° C. and low pressures of around 116 mbar.

Additionally, in this field, electrical cables are subjected to high voltages which, in combination with conditions such as moisture, high temperatures and low pressures, may promote the occurrence of partial discharges. Partial discharges, which are minute electrical arcs in the insulating material, cause, over time, the electrically insulating material to degrade, which may lead to dielectric breakdown thereof.

The problem of partial discharges in electrical cables has become more significant with the development of hybrid or electric propulsion systems, in particular in the aerospace field. Specifically, in such systems, the cables will have to convey voltages and currents of increasingly high intensities in order to reach powers that may range up to several tens of megavoltamperes (MVA).

Additionally, in the electrical chain of hybrid or electric propulsion systems, it is possible to use a pulse-width modulation (PWM) system to convert a DC voltage into a variable voltage in order to regulate the speed of electric motors.

PWM is based on the generation of a squarewave voltage with a variable duty cycle. Since the rise time of the pulse is short (of the order of 200 ns), an overvoltage may be created (which may reach up to twice the value of the voltage) which is due in particular to reflections of the voltage wave at the ends of the cable. Such overvoltages promote the occurrence of partial discharges. Additionally, the high cut-off frequency of a PWM system (of the order of several tens of kHz) may accelerate the erosion of the insulating layer in the event of the occurrence of partial discharges.

At such high voltage values, the thickness of the insulating layer should be substantial in order to avoid the occurrence of partial discharges which would make the cables too heavy and unsuitable for use in certain fields such as aerospace, for example.

OBJECTS AND SUMMARY

The object of the present invention is to address at least one of the drawbacks of the prior art by providing an electrical cable that features an insulation system allowing it to be subjected to high voltages and large currents, and to extreme temperatures and low pressures, while still exhibiting low bulk and/or weight.

A first subject of the present invention is an insulated electrically conductive element for the aerospace field, comprising an elongate electrically conductive element surrounded by at least two layers, said two layers being an electrically insulating layer surrounding the elongate electrically conductive element and a first semiconductor layer surrounding said electrically insulating layer, at least one of said two layers comprising at least one fluoropolymer.

The aforementioned insulated electrically conductive element withstands a wide range of temperatures, in particular from −70° C. to 260° C., and low pressures, in particular lower than 116 mbar. In addition, this insulated electrically conductive element can withstand high electric fields E, while still exhibiting limited bulk and weight.

According to one preferred embodiment, the insulated electrically conductive element may further comprise a third layer, said third layer being a second semiconductor layer surrounding the elongate electrically conductive element and being surrounded by the insulating layer.

According to this preferred embodiment, the first semiconductor layer, the electrically insulating layer and the second semiconductor layer may constitute a trilayer insulation system. In other words, the electrically insulating layer may be in direct physical contact with the first semiconductor layer, and the second semiconductor layer may be in direct physical contact with the electrically insulating layer.

Such a trilayer insulation system allows the electrically conductive element to limit or even prevent the occurrence of partial discharges.

The trilayer electrical cables known from the prior art are generally used in the terrestrial domain, such as, for example, in electricity transmission networks or in ship hybrid propulsion systems, and are therefore not subjected to the extreme conditions associated with the aerospace field. Generally, the trilayer cables of the prior art withstand temperatures that do not go below −40° C. or above 150° C., and withstand an electric field of at most 5 kV/mm.

Preferably, the fluoropolymer may be chosen from copolymers obtained on the basis of tetrafluoroethylene monomer, and in particular from polytetrafluoroethylene (PTFE); fluorinated ethylene propylene (FEP) copolymers such as, for example, poly(tetrafluoroethylene-co-hexafluoropropylene); perfluoroalkoxy alkane (PFA) copolymers such as, for example, perfluoro(alkyl vinyl ether)/tetrafluoroethylene copolymers; perfluoromethoxy alkane (MFA) copolymers; and ethylene tetrafluoroethylene (ETFE); and one of the mixtures thereof.

Particularly preferably, the fluoropolymer may be chosen from perfluoroalkoxy alkane (PFA) copolymers.

When one of the three layers comprises at least one fluoropolymer, the two other layers may comprise at least one polymer, in particular at least one olefin polymer, chosen from a linear low-density polyethylene (LLDPE); a very low-density polyethylene (VLDPE); a low-density polyethylene (LDPE); a medium-density polyethylene (MDPE); a high-density polyethylene (HDPE); an ethylene propylene monomer (EPM) copolymer; an ethylene propylene diene monomer (EPDM) terpolymer; a copolymer of ethylene and of vinyl ester such as an ethylene-vinyl acetate (EVA) copolymer; a copolymer of ethylene and of acrylate, such as an ethylene butyl acrylate (EBA) copolymer or an ethylene methyl acrylate (EMA) copolymer; a copolymer of ethylene and of α-olefin such as a copolymer of ethylene and of octene (PEO) or a copolymer of ethylene and of butene (PEB); a fluoropolymer chosen from copolymers obtained on the basis of tetrafluoroethylene (TFE) monomer such as, for example, polytetrafluoroethylene (PTFE), fluorinated ethylene propylene (FEP) copolymers such as, for example, poly(tetrafluoroethylene-co-hexafluoropropylene), perfluoroalkoxy alkane (PFA) copolymers such as, for example, perfluoro(alkyl vinyl ether)/tetrafluoroethylene copolymers, perfluoromethoxy alkane (MFA) copolymers; and ethylene tetrafluoroethylene (ETFE); and one of the mixtures thereof.

According to one embodiment, the insulating layer and the first semiconductor layer comprise at least one fluoropolymer.

According to another possible embodiment, and when the insulated electrically conductive conductor comprises three layers, at least two of the three layers may comprise at least one fluoropolymer, the third layer may comprise at least one polymer, in particular at least one olefin polymer chosen from the aforementioned olefin polymers.

According to one preferred embodiment, and when the insulated electrically conductive conductor comprises three layers, each of the three layers comprises at least one fluoropolymer, preferably the same fluoropolymer.

According to one particularly preferred embodiment, each of the three layers comprises at least one polymer chosen from perfluoroalkoxy alkane (PFA) copolymers.

The PFA used in the electrically insulated conductor of the invention may, for example, be the PFA sold by Daikin under the trade reference Neoflon PFA, or the PFA sold by 3M under the trade reference Dyneon.

At least one or more of the layers, and preferably both layers or all three layers (depending on the embodiment), withstands temperatures ranging from −70° C. to 260° C., preferably ranging from −65° C. to 250° C., and particularly preferably from −55° C. to 180° C. A layer withstanding such temperature ranges means that this layer exhibits a feature 1. Preferably, the one or more layers that withstand these temperature ranges are the layers that comprise at least one fluoropolymer.

The insulating layer withstands an electric field E ranging from 1 kV/mm to 30 kV/mm, preferably ranging from 3 kV/mm to 20 kV/mm, and particularly preferably ranging from 5 kV/mm to 20 kV/mm, in particular when this electric field is applied continuously for a duration that may last up to 430 000 hours (h), preferably up to 260 000 h, and even more preferably up to 90 000 h, these values being given for an electrically insulating layer in the form of a plate with a thickness of 0.5 mm. An insulating layer withstanding such electric field ranges means that this layer exhibits a feature 2. Preferably, the layer that withstands these electric field ranges is a layer that comprises at least one fluoropolymer.

The insulating layer may exhibit at least one of the following additional features:

feature 3: a dielectric strength according to the ASTM D149 standard that is higher than 20 kV/mm, preferably higher than 40 kV/mm, and particularly preferably higher than 60 kV/mm, these values being given for an electrically insulating layer in the form of a plate with a thickness of 0.5 mm and being obtained via statistical analysis with a two-parameter Weibull distribution (cf. IEC 62539 standard) over a population of at least ten plates; the shape factor of said distribution being greater than 20;

feature 4: a dielectric loss factor according to the ASTM D150 standard that is lower than $10^{-2}$, preferably lower than $10^{-3}$, and particularly preferably lower than $3\times10^{-4}$, for a frequency of between 100 Hz and 100 kHz and at a temperature from 0 to 200° C.;

feature 5: a dielectric permittivity according to the ASTM D150 standard that is lower than 2.3, preferably lower than 2.2, and particularly preferably lower than 2.1;

feature 6: a coefficient of linear thermal expansion according to the ASTM D696 standard that is lower than $25\times10^{-5}$ $K^{-1}$ at 23° C., preferably lower than $20\times10^{-5}$ $K^{-1}$ at 23° C., and particularly preferably lower than $15\times10^{-5}$ $K^{-1}$ at 23° C.; and feature 7: a limiting oxygen index (LOI) according to the ASTM D2863 standard that is greater than 30, preferably greater than 60, and particularly preferably greater than 90.

According to one possible embodiment, the first and/or the second semiconductor layer may exhibit either or both of features 6 and 7.

According to one particularly preferred embodiment, each of the three layers comprises at least one polymer chosen from perfluoroalkoxy alkane (PFA) copolymers and all three of the layers exhibit feature 1 and one additional feature, preferably two additional features, from additional features 6 and 7.

Electrically Conductive Element

The elongate electrically conductive element may be a single-part conductor, such as, for example, a metal wire, or a multipart conductor, such as a plurality of metal wires which are or are not twisted, preferably a plurality of metal wires which are or are not twisted, so as to increase the flexibility of the cable. When the insulated electrically conductive element comprises a plurality of metal wires, some of the metal wires at the centre of the conductor may be replaced with non-metal wires exhibiting feature 1.

The elongate electrically conductive element may be made of aluminium, of aluminium alloy, of copper, of copper alloy, and one of the mixtures thereof.

The elongate electrically conductive element may comprise one or more carbon nanotubes or with graphene in order to increase electrical conductivity, thermal conductivity and/or mechanical strength.

According to one possible embodiment, the electrically conductive element may be covered with a metal or with an alloy different from the metal forming the conductor or different from the alloy forming the metal, such as, for example, nickel, a nickel alloy, tin, a tin alloy, silver, a silver alloy or one of the mixtures thereof. Such a covering, called plating, may allow the conductor to be protected from corrosion and/or its contact resistance to be improved.

The electrically conductive element being formed of a metal or of a metal alloy means that the electrically conductive element comprises at least 70%, preferably at least 80%, and even more preferably at least 90% of said metal or of said metal alloy.

The electrically conductive element may have a cross section ranging from 3 $mm^2$ (AWG 12) to 107 $mm^2$ (AWG 0000), preferably ranging from 14 $mm^2$ (AWG 6) to 107 $mm^2$ (AWG 0000), preferably ranging from 34 $mm^2$ (AWG 2) to 107 $mm^2$ (AWG 0000), and even more preferably ranging from 68 $mm^2$ (AWG 00) to 107 $mm^2$ (AWG 0000).

The electrically conductive element may have an outer diameter ranging from 2.0 mm to 20 mm, preferably ranging from 4.5 mm to 18 mm, preferably ranging from 7.0 mm to 16 mm, and even more preferably ranging from 10 mm to 15.2 mm.

Electrically Insulating Layer

Preferably, the electrically insulating layer may comprise the same polymeric composition as the first semiconductor layer. Preferably, the electrically insulating layer may comprise the same polymeric composition as the second semiconductor layer, when present. Particularly preferably, the electrically insulating layer may comprise the same polymeric composition as the first and second semiconductor layers.

In the present invention, a polymeric composition corresponds to a composition comprising one or more polymers in a given amount, and in particular with percentages by weight of given polymers. The polymeric composition essentially comprises one or more polymers, preferably only one or more polymers. Thus, a layer may be formed from a polymeric mixture comprising a polymeric composition to which may be added additional agents such as, for example, fillers, pigments, crosslinking agents, flame-retardant fillers, antioxidants, conductive fillers, etc.

Preferably, the electrically insulating layer may comprise the same polymeric composition as the first semiconductor layer, the polymeric composition comprising one or more perfluoroalkoxy alkane (PFA) copolymers. Preferably, the electrically insulating layer may comprise the same polymeric composition as the second semiconductor layer, the polymeric composition comprising one or more perfluoroalkoxy alkane (PFA) copolymers. Particularly preferably, the electrically insulating layer may comprise the same polymeric composition as the first and second semiconductor layers, the polymeric composition comprising one or more perfluoroalkoxy alkane (PFA) copolymers.

The electrically insulating layer may comprise at least 50% by weight of polymer(s), preferably at least 70% by weight of polymer(s), even more preferably at least 80% by weight of polymer(s), and even more preferably at least 90% by weight of polymer(s), in relation to the total weight of the electrically insulating layer.

The electrically insulating layer of the invention may conventionally comprise additional agents such as, for example, fillers, pigments, crosslinking agents, flame-retardant fillers, antioxidants, etc.

The electrically insulating layer may be a layer extruded around the electrically conductive element, or a layer in the form of a ribbon wound around the electrically conductive element, or a layer of varnish deposited around the electrically conductive element, or a combination thereof.

Preferably, the electrically insulating layer is extruded around the electrically conductive element. Particularly preferably, the electrically insulating layer is co-extruded with the first semiconductor layer around the electrically conductive element or, when a second semiconductor layer is present, co-extruded with the first and the second semiconductor layers around the electrically conductive element.

According to one embodiment, the insulating layer may be directly placed around the electrically conductive element. According to one preferred embodiment in which the electrically insulated conductor comprises two semiconductor layers, the electrically insulating layer may be directly placed around the second semiconductor layer and therefore be in direct physical contact with said layer. According to this preferred embodiment, the insulating layer may also be in direct physical contact with the first semiconductor layer surrounding it.

In the present invention, what is meant by "electrically insulating layer" is a layer whose electrical conductivity is very low or even zero, in particular lower than $10^{-6}$ S/m, and preferably lower than $10^{-13}$ S/m, within the operating temperature range of up to 260° C.

According to one preferred embodiment, the insulating layer has a thickness $e_i$, the value of said thickness $e_i$ being determined according to the operating voltage U of the insulated electrically conductive element and an inner diameter $d_1$ of the electrically insulating layer.

In the case where the electrically insulating layer is placed directly in contact with the electrically conductive element, the diameter $d_1$ corresponds to the outer diameter of the electrically conductive element. In the case where the insulated electrically conductive element comprises a second semiconductor layer and the electrically insulating layer is in direct contact with the second semiconductor layer, the diameter $d_1$ corresponds to the outer diameter of the second semiconductor layer.

According to this preferred embodiment, such an electrically conductive element makes it possible to limit or even prevent the occurrence of partial discharges, known as partial discharge inception (PDI). In particular, the combination of an insulation system comprising at least one electrically insulating layer and at least a first semiconductor layer and of a thickness of the insulation layer determined according to this preferred embodiment makes it possible to limit or even prevent the occurrence of partial discharges, even at very high operating voltage values for the electrically conductive element.

According to one preferred embodiment, the determination of the thickness $e_i$ of the insulation layer may involve a calculation, for example a calculation implemented by computer. In particular, the calculation of the thickness value of the insulation layer may involve a value of the operating voltage U of the insulated electrically conductive element and a value of the inner diameter d1 of the electrically insulating layer.

The operating voltage U corresponds to the voltage that may be applied between the insulated electrically conductive element and neutral (the phase-to-ground voltage) or between two insulated electrically conductive elements (the phase-to-phase voltage) and which may be dependent on its use. The voltage U may have a value of at least 540 V, preferably of at least 800 V, preferably of at least 1200 V, and particularly preferably of at least 3000 V. In the case of a continuous voltage, these voltage values correspond to the difference in potential between the two poles (plus and minus). In the case of a non-continuous voltage (for example AC or in PWM systems) these voltage values are peak-to-peak values.

According to this preferred embodiment, the thickness $e_i$ of the electrically insulating layer may be determined according to a ratio of the operating voltage U to the diameter $d_1$.

Preferably, when the electrically insulated conductor comprises two layers, namely the insulating layer and the first semiconductor layer of thickness $e_1$, the value of the thickness $e_i$ satisfies the following relationship:

$$ei \geq e1$$

When the electrically insulated conductor further comprises a second semiconductor layer of thickness $e_2$, the value of the thickness $e_i$ satisfies the following relationship:

$$ei \geq e1+e2$$

In the present invention, the thickness e of a layer is in particular a mean thickness which may vary by ±30%, preferably by ±20%, and particularly preferably by ±10% with respect to the mean thickness. This variation in thickness may be random and be due in particular to the method of application of said layer on the element or the layer surrounding it.

The minimum value of the thickness $e_i$ expressed in millimetres (mm) may be determined according to a following relationship R1:

$$R1 = \frac{U}{E_{max} \times \frac{d_1}{2}}$$

U being expressed in kilovolts (kV), $E_{max}$ being the maximum value of the electric field that may be applied to the insulation layer, or else that the material forming the insulation layer can withstand, for the required service life of the insulated conductive element in its operating environment, expressed in kilovolts/mm (kV/mm), and the diameter $d_1$ being expressed in millimetres (mm).

The value of the electric field $E_{max}$ corresponds to the maximum value of the electric field that may be applied to the insulation layer of the insulated electrically conductive element without there being any degradation of said element leading to dielectric breakdown of the insulation layer for the required service life of the cable. The value of the electric field $E_{max}$ may be at most 30 kV/mm, preferably at most 20 kV/mm, and particularly preferably at most 10 kV/mm.

Preferably, the minimum value of the thickness $e_i$ is determined according to a following expression E1:

$$E1 = \exp\left(\frac{U}{E_{max} \times \frac{d_1}{2}}\right) - 1$$

Particularly preferably, the thickness $e_i$ satisfies the following relationship:

$$ei \geq \frac{d_1}{2}\left[\exp\left(\frac{U}{E_{max} \times \frac{d_1}{2}}\right) - 1\right]$$

The maximum value of the thickness $e_i$ may be determined according to a following relationship R2:

$$R2 = \frac{3 \times U}{E_{max} \times \frac{d_1}{2}}$$

Preferably, the maximum value of the thickness $e_i$ may be determined according to a following expression E2:

$$E2 = \exp\left(\frac{3 \times U}{E_{max} \times \frac{d_1}{2}}\right) - 1$$

Particularly preferably, the thickness $e_i$ satisfies the following relationship:

$$ei \leq \frac{d_1}{2}\left[\exp\left(\frac{3 \times U}{E_{max} \times \frac{d_1}{2}}\right) - 1\right]$$

According to one preferred embodiment, the thickness $e_i$ satisfies the following relationship:

$$\frac{d_1}{2}\left[\exp\left(\frac{U}{E_{max} \times \frac{d_1}{2}}\right) - 1\right] \leq ei \leq \frac{d_1}{2}\left[\exp\left(\frac{3 \times U}{E_{max} \times \frac{d_1}{2}}\right) - 1\right]$$

According to one particularly preferred embodiment, the thickness $e_i$ simultaneously satisfies both of the following relationships:

$$ei \geq \frac{d_1}{2}\left[\exp\left(\frac{U}{E_{max} \times \frac{d_1}{2}}\right) - 1\right]$$

and $$ei \geq e1 + e2$$

According to one particularly preferred embodiment, the value of the electric field $E_{max}$ is 5 kV/mm and the thickness $e_i$ then satisfies the following relationship:

$$ei \geq \frac{d_1}{2}\left[\exp\left(\frac{U}{2,5 \times d_1}\right) - 1\right]$$

First Semiconductor Layer

The first semiconductor layer may comprise at least 50% by weight of polymer(s), preferably at least 70% by weight of polymer(s), even more preferably at least 80% by weight of polymer(s), and even more preferably at least 90% by weight of polymer(s).

The first semiconductor layer of the invention may conventionally comprise electrically conductive fillers in a sufficient amount to make the first layer semiconductive. By way of example, it may comprise from 0.1% to 40% by weight of electrically conductive fillers, such as, for example, carbon black, carbon nanotubes, etc.

The first semiconductor layer may be a layer extruded around the electrically insulating layer, or a layer in the form of a ribbon wound around the electrically insulating layer, or a layer of varnish deposited around the electrically insulating layer, or a combination thereof.

According to one preferred embodiment, the first semiconductor layer may be extruded around the electrically insulating layer.

The first semiconductor layer may have a thickness $e_1$ ranging from 0.05 mm to 1.0 mm, preferably ranging from 0.07 mm to 0.8 mm, and particularly preferably a thickness ranging from 0.09 mm to 0.5 mm.

In the present invention, what is meant by "semiconductor layer" is a layer whose volume resistivity is lower than 10 000 Ω×m (ohm-metres) (at ambient temperature), preferably lower than 1000 Ω×m, and particularly preferably lower than 500 Ω×m.

Second Semiconductor Layer

The second semiconductor layer may comprise at least 50% by weight of polymer(s), preferably at least 70% by weight of polymer(s), even more preferably at least 80% by weight of polymer(s), and even more preferably at least 90% by weight of polymer(s).

The second semiconductor layer may conventionally comprise electrically conductive fillers in a sufficient amount to make the first layer semiconductive. By way of example, it may comprise from 0.1% to 40% by weight of electrically conductive fillers, such as, for example, carbon black, carbon nanotubes, etc.

The second semiconductor layer may be a layer extruded around the elongate electrically conductive element, or a layer in the form of a ribbon wound around the elongate electrically conductive element, or a layer of varnish deposited around the elongate electrically conductive element, or a combination thereof.

Preferably, the second semiconductor layer is extruded around the elongate electrically conductive element.

According to one preferred embodiment, the second semiconductor layer may be directly placed around the electrically conductive element and therefore be in direct physical contact with said element. The second semiconductor layer thus allows the electric field to be smoothed around the conductor.

The second semiconductor layer may have a thickness $e_2$ ranging from 0.05 mm (millimetres) to 1.0 mm, preferably ranging from 0.07 mm to 0.8 mm, and particularly preferably a thickness ranging from 0.09 mm to 0.5 mm.

The second semiconductor layer may have an outer diameter ranging from 0.3 mm to 22 mm, preferably ranging from 0.8 mm to 20 mm, preferably ranging from 1.0 mm to 15 mm, and particularly preferably ranging from 1.2 mm to 12 mm.

In the present invention, what is meant by "semiconductor layer" is a layer whose volume resistivity is lower than 10 000 Ω×m (ohm-metres) (at ambient temperature), preferably lower than 1000 Ω×m, and particularly preferably lower than 500 Ω×m.

Insulated Electrically Conductive Element

The insulated electrically conductive element may be used at an intensity that may range from 35 $A_{RMS}$ to 1000 $A_{RMS}$, preferably from 80 $A_{RMS}$ to 600 $A_{RMS}$, particularly preferably from 190 $A_{RMS}$ to 500 $A_{RMS}$, these values being given for a maximum temperature of the conductor in service of 260° C.

The insulated electrically conductive element may be used with DC or with AC. When it is used with AC, the operating frequency may range from 10 Hz (hertz) to 100 kHz (kilohertz), preferably from 10 Hz to 10 kHz, particularly preferably from 10 Hz to 3 kHz. In a PWM system, what is meant by frequency is the fundamental frequency of the current.

The insulated electrically conductive element may be used in an aircraft in a pressurized or unpressurized area, with a power ranging from 8 kVA (kilovoltamperes) to 3000 kVA, preferably from 100 kVA to 2000 kVA, and particularly preferably from 250 kVA to 1500 kVA.

Electrically Conductive Cable

A second subject of the invention relates to an electrically conductive cable comprising one or more insulated electrically conductive elements as described above.

The voltage, intensity, power and frequency values described for the insulated electrically conductive element also apply for the electrically conductive cable.

The electrical cable may comprise a metal shield forming electromagnetic shielding. In the case where the cable comprises a single insulated electrically conductive element, the metal shield may be placed around the second semiconductor layer. In the case where the cable comprises a plurality of insulated electrically conductive elements, the metal shield may be placed around all of the insulated electrically conductive elements.

The metal shield may be a "wire" shield, composed of an assembly of copper- or aluminium-based conductors, which is arranged around the second semiconductor layer or around all of the insulated electrically conductive elements; a "ribbon" shield composed of one or more conductive metal ribbons placed in a spiral around the second semiconductor layer or around all of the insulated electrically conductive elements; a "leaktight" shield such as a metal tube surrounding the second semiconductor layer or all of the insulated electrically conductive elements; or a "braided" shield forming a braid around the second semiconductor layer. The metal shield is preferably "braided", in particular to endow the electrically conductive cable with flexibility.

All of the types of metal shields may play the role of earthing the electrical cable and may thus transmit fault currents, for example in the event of a short circuit in the network concerned.

Additionally, the electrically conductive cable may comprise a protective sheath. When the cable comprises a metal shield, the protective sheath may surround the metal shield. In the case where the cable does not comprise any metal shield, the protective sheath may surround the second semiconductor layer when the cable comprises a single insulated electrically conductive element, or surround all of the insulated electrically conductive elements when the cable comprises a plurality thereof.

The protective sheath may be a layer based on polymers such as those described for the electrically insulating layer. For an application in the aerospace field, the protective sheath may preferably be based on one or more fluoropolymers (such as, for example, PTFE, FEP, PFA and/or ETFE) and/or on polyimide.

Preferably, the protective sheath may be the outermost layer of the cable.

The protective sheath may be in the form of a ribbon, of an extrudate or of a varnish.

BRIEF DESCRIPTION OF THE DRAWINGS

The attached drawings illustrate the invention.

DESCRIPTION OF ONE OR MORE EMBODIMENTS

For reasons of clarity, only those elements that are essential to the understanding of the embodiments described below have been presented diagrammatically, without regard to scale.

Figure 1:
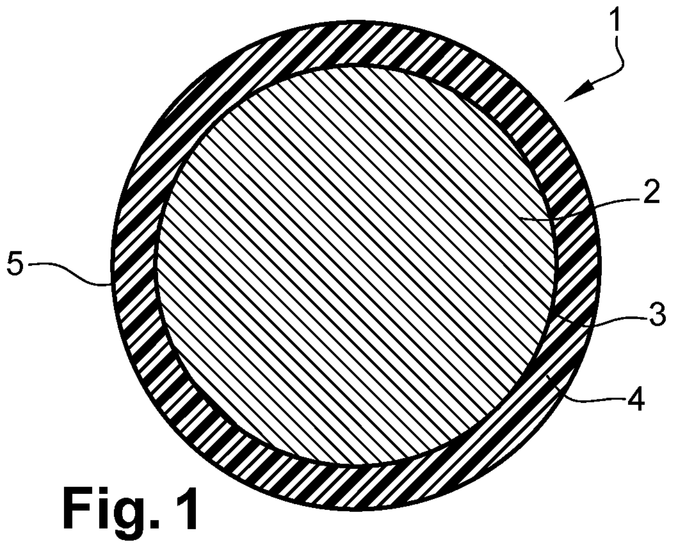
FIG. 1 shows a cross section of an insulated electrically conductive element according to one embodiment of the invention.

As illustrated in FIG. 1, an insulated electrically conductive element 1 according to one embodiment of the invention comprises an elongate electrically conductive element 2, a second semiconductor layer (CSC) 3 surrounding the elongate electrically conductive element 2, an electrically insulating layer (CI) 4 surrounding the second semiconductor layer 3 and a first semiconductor layer (CSC) 5 surrounding said electrically insulating layer.

The second semiconductor layer 3 has a thickness $e_2$ and the first semiconductor layer 5 has a thickness $e_1$. The electrically insulating layer 4 has a thickness $e_i$ determined according to one embodiment of the invention which is greater than the sum: $e_1+e_2$.

In this embodiment, the second semiconductor layer 3, the electrically insulating layer 4 and the first semiconductor layer 5 constitute a trilayer insulation system, which means that the electrically insulating layer 4 is in direct physical contact with the second semiconductor layer 3, and the first semiconductor layer 5 is in direct physical contact with the electrically insulating layer 4.

The elongate electrically conductive element 2 is formed by 37 strands made of copper covered with a layer of nickel and thus has a diameter of 12 AWG (American Wire Gauge).

The first and the second semiconductor layers 5 and 3 and the insulating layer 4 are formed by PFA.

Figure 2:
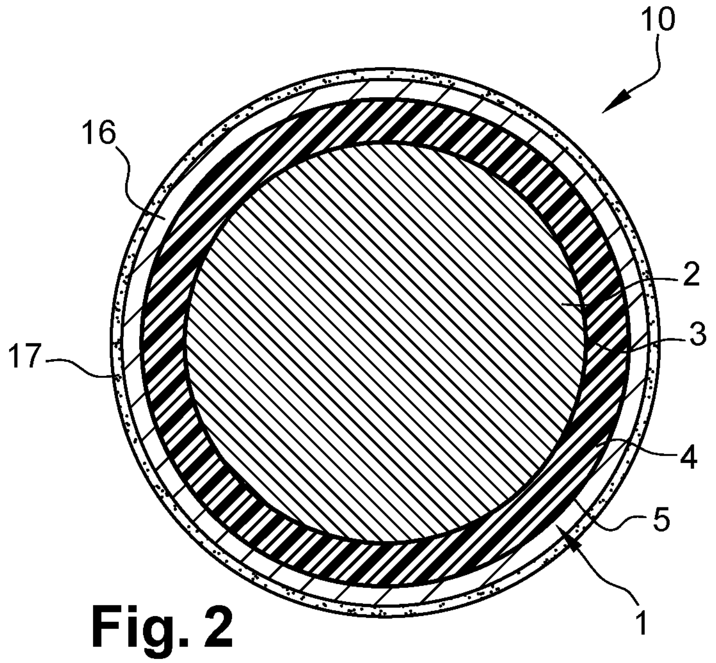
FIG. 2 shows a cross section of an electrically conductive cable according to a first embodiment of the invention.

FIG. 2 shows an electrically conductive cable 10 according to a first embodiment of the invention comprising a single insulated electrically conductive element 1 surrounded by a metal shield 16 of "braided" type made of nickel-plated copper. The metal shield 16 is surrounded by a protective sheath 17 which is the outermost layer of the cable 10 and which is based on PFA.

Figure 3:
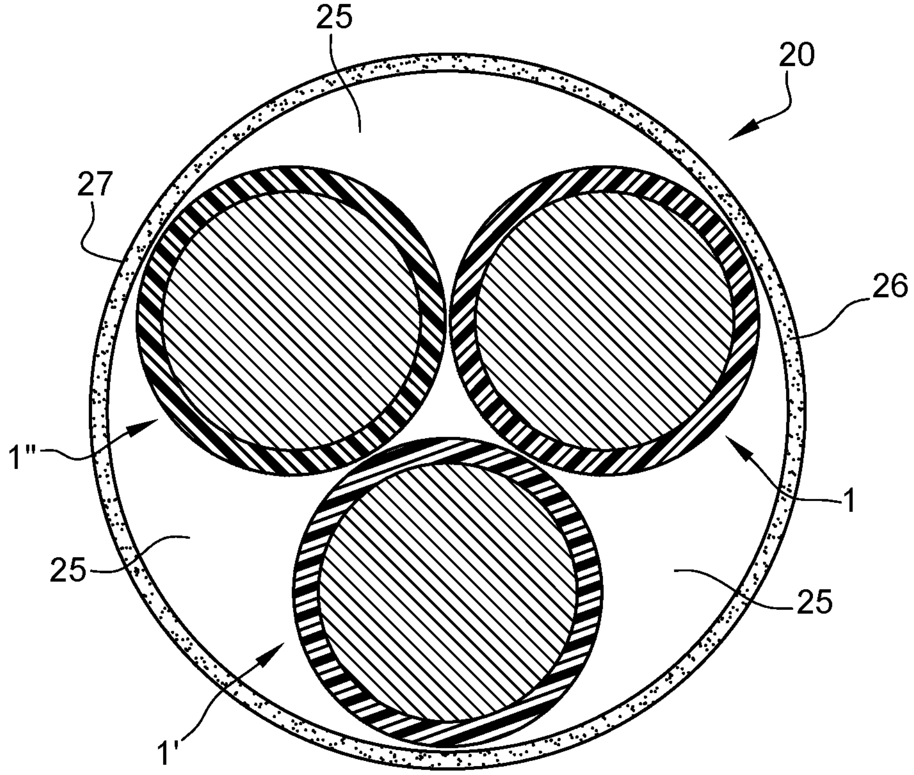
FIG. 3 shows a cross section of an electrically conductive cable according to a second embodiment of the invention.

FIG. 3 shows an electrically conductive cable 20 according to a first embodiment of the invention comprising three insulated electrically conductive elements 1, 1' and 1" according to the invention. In this embodiment, the three insulated electrically conductive elements are identical; however, according to another possible embodiment, they may be different. They may differ in particular in the thickness of the semiconductor layers and the insulating layer.

The assembly formed by the three insulated electrically conductive elements 1, 1' and 1" is surrounded by a metal shield 16 of braided type. The metal shield 16 is surrounded by a protective sheath 17 which is the outermost layer of the cable 10 and is based on PFA. The electrically conductive cable 20 also comprises spaces 25 which comprise air.

EXEMPLARY EMBODIMENTS

Example 1

The electrically conductive cable 10 according to the first embodiment and without the protective sheath 17 of the invention is prepared by co-extrusion of the trilayer insulation system around the elongate electrically conductive element 2, the trilayer insulation system being formed by the first semiconductor layer 5, the electrically insulating layer 4 and the second semiconductor layer 3.

The metal shield 16 is then placed around the second semiconductor layer.

The elongate electrical conductor 2 is formed by 37 strands made of copper and covered with a layer of nickel according to the EN 2083 European standard.

The first semiconductor layer is formed from a polymeric mixture A comprising at least 60% by weight of perfluoroalkoxy alkane (PFA) copolymer in relation to the total weight of the polymeric mixture, sold under the reference S185.1 B by PolyOne.

The electrically insulating layer is formed from a second polymeric mixture B comprising at least 95% by weight of perfluoroalkoxy alkane (PFA) copolymer in relation to the total weight of the polymeric mixture, sold under the reference AP-210 by DAIKIN.

The second semiconductor layer is formed from a third polymeric mixture C comprising at least 60% by weight of perfluoroalkoxy alkane (PFA) copolymer in relation to the total weight of the polymeric mixture, sold under the reference S185.1 B by PolyOne.

The polymeric mixtures A, B and C were each introduced into one of the three extruders for the three-layer co-extrusion and extruded around the elongate electrically conductive element 2 with a temperature profile ranging from 320° C. to 380° C., the speed of rotation of the screws of these three extruders being adjusted to between 5 and 100 rpm.

The cable 10 having the dimensions below is then formed:

mean diameter of the conductor=2.15 mm (±10%);
mean thickness $e_2$=0.15 mm (±10%);
mean outer diameter of the layer 3=2.45 mm (±10%);
mean thickness $e_i$=1.62 mm (±10%);
mean outer diameter of the layer 4=5.70 mm (±10%);
mean thickness $e_1$=0.15 mm (±10%);
mean outer diameter of the layer 5=6.00 mm (±10%); and
mean thickness of the shield=0.2 mm (±10%).

In this exemplary embodiment, the cable 10 comprises a second semiconductor layer 3 which is in direct contact with the electrically insulating layer, and the inner diameter $d_1$ of the electrically insulating layer is equal to the outer diameter of the second semiconductor layer 3.

The insulating layer 4 of the cable 10 exhibits the following features:

feature 1: withstands temperatures ranging from −55° C. to 250° C.;

feature 2: withstands an electric field E from 10 $kV_{peak}$/mm, when this electric field is applied continuously for a duration that may last up to 90 000 hours (h);

feature 3: a dielectric strength according to the ASTM D149 standard that is higher than 60 kV/mm;

feature 4: a dielectric loss factor according to the ASTM D150 standard of $3\times10^{-4}$ for a frequency of between 100 Hz and 100 kHz and at a temperature from 0 to 200° C.;

feature 5: a dielectric permittivity according to the ASTM D150 standard of 2.0 for a frequency of between 100 Hz and 100 kHz and at a temperature from 0 to 200° C.;

feature 6: a coefficient of linear thermal expansion according to the ASTM D696 standard of 12 $K^{-1}$ at 23° C.; and feature 7: a limiting oxygen index (LOI) according to the ASTM D2863 standard of 90.

This cable is intended for an operating voltage of 10 $kV_{peak}$.

Comparative Examples 2 to 6

The cable 10 of Example 1 will be compared with cables 2 to 6 in which the trilayer insulation system is replaced with the insulation given in Table 1, the electrically conductive element being identical to that of the cable 10.

TABLE 1

| No | Insulation | Polymer | Thickness (mm) | Diameter (mm) |
|---|---|---|---|---|
| 2 | CI, overlaid ribbon | PTFE | 0.42 | 3.0 |
| 3 | CI, edge-to-edge ribbon | PTFE | 0.42 | 3.0 |
| 4 | CI, extruded | PFA | 0.42 | 3.0 |
| 5 | CI1, extruded | PFA | 0.15 | 2.45 |
| | CI2, extruded | PFA | 1.62 | 5.70 |

TABLE 1-continued

| No | Insulation | Polymer | Thickness (mm) | Diameter (mm) |
|---|---|---|---|---|
| 6 | CSC1, ribbon | PFA[(1)] | 0.12 | 2.39 |
| | CI, ribbon | PFA | 0.40 | 3.19 |
| | CSC2, ribbon | PFA[(1)] | 0.12 | 3.43 |

[(1)] Comprises electrically conductive fillers

The thickness $e_i$ of the electrically insulating layer 4 does indeed satisfy both of the following relationships applied for the values of the example:

[Math. 9]

$$\frac{2.45}{2}\left[\exp\left(\frac{10}{10\times\frac{2.45}{2}}\right)-1\right] \le ei \le$$

$$\frac{2.15}{2}\left[\exp\left(\frac{3\times 10}{10\times\frac{2.45}{2}}\right)-1\right] => 1.55\ \text{mm} \le ei \le 13.00\ \text{mm}$$

$$ei \ge 0,\ 15 + 0,\ 15$$

[Math. 10]

The cables of Examples 1 to 6 are then subjected to a partial discharge test according to the EN 3475-307 standard, Method B. In this test, the voltage is increased by steps of 50 V until discharges occur and the partial discharge inception voltage (PDIV) is noted. Next, the voltage is decreased until partial discharges stop occurring and the partial discharge extinction voltage (PDEV) is noted.

Figure 4:
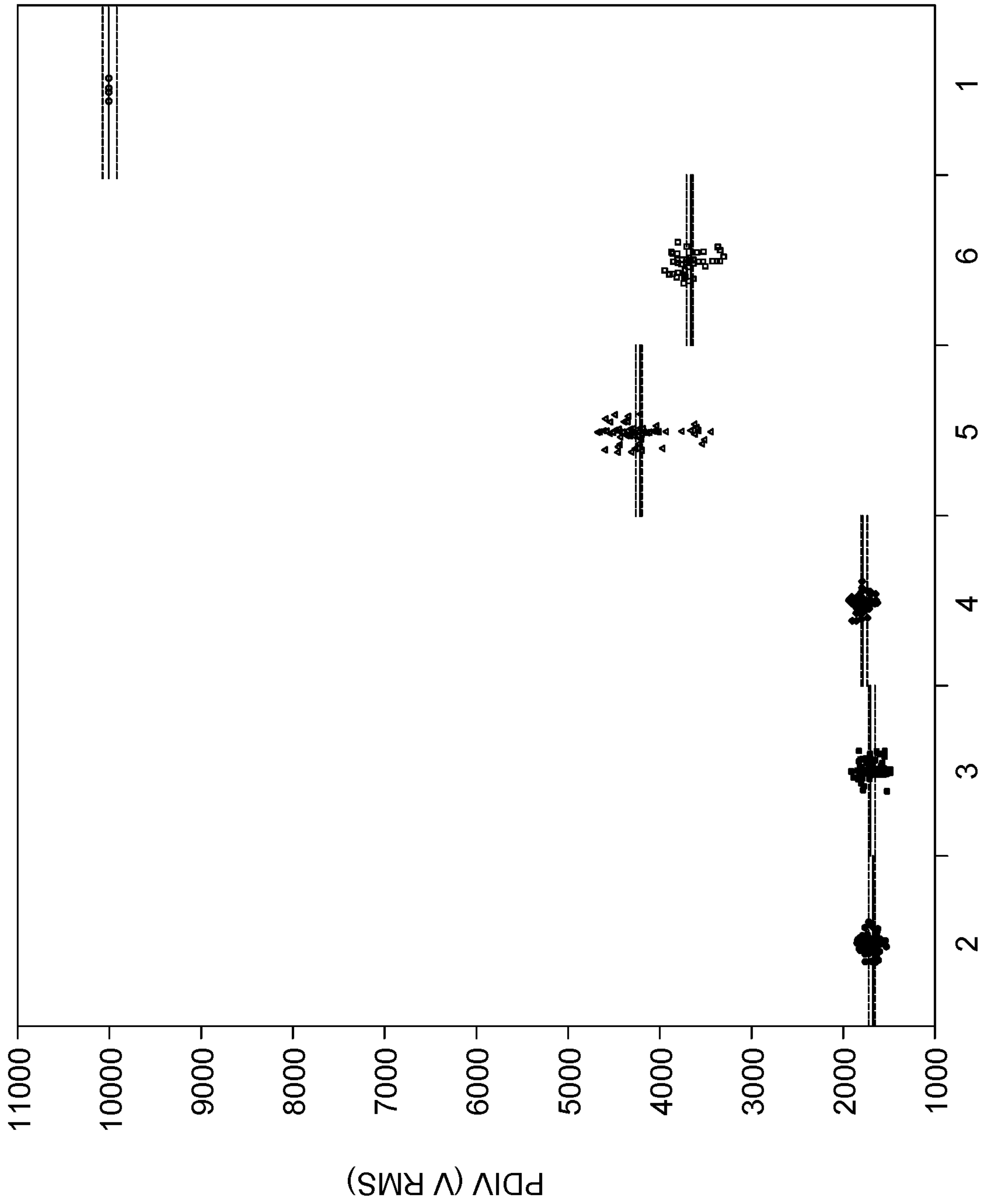
FIG. 4 is a graph showing the partial discharge inception voltage for various types of cables.
Figure 5:
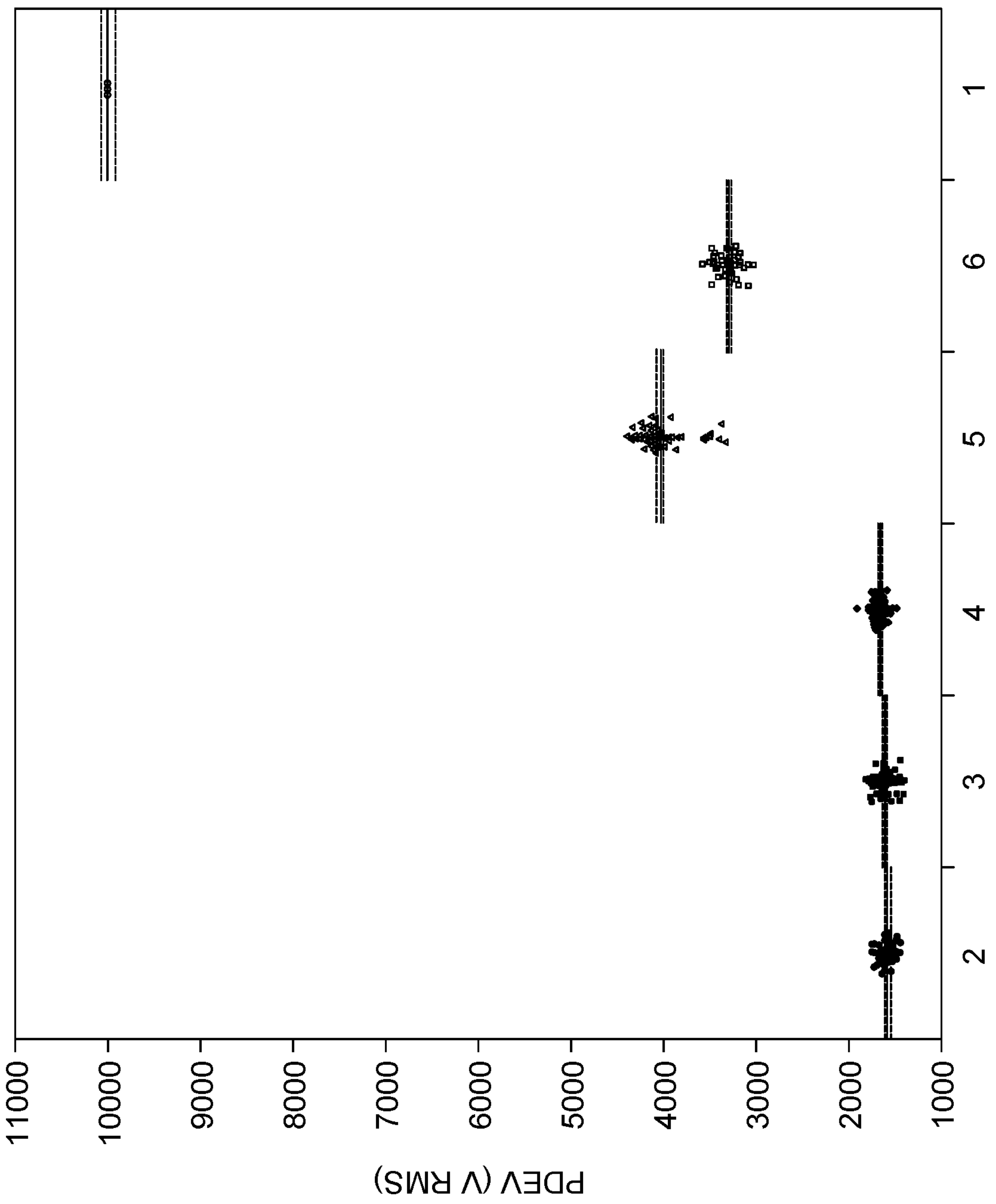
FIG. 5 is a graph showing the partial discharge extinction voltage for various types of cables.

For this, 10 samples were prepared for each exemplary cable 1 to 6 and the experiment was performed 10 times on each of these cables. The results are given in Tables 2 and 3 and are illustrated in FIGS. 4 and 5, respectively:

TABLE 2

| PDIV | U mean (V) | U min. (V) | Umax. (V) | Dev Std (V) | CV (%) |
|---|---|---|---|---|---|
| 1 | 10000 | 10000 | 10000 | 0 | 0 |
| 2 | 1680 | 1526 | 1830 | 66 | 3.9 |
| 3 | 1687 | 1485 | 1901 | 96 | 5.7 |
| 4 | 1778 | 1622 | 1919 | 72 | 4.1 |
| 5 | 4221 | 3437 | 4670 | 267 | 6.3 |
| 6 | 3659 | 3295 | 3943 | 141 | 3.9 |

TABLE 3

| PDEV | U mean (V) | U min. (V) | Umax. (V) | Dev Std (V) | CV (%) |
|---|---|---|---|---|---|
| 1 | 10000 | 10000 | 10000 | 0 | 0 |
| 2 | 1551 | 1410 | 1707 | 67 | 4.3 |
| 3 | 1584 | 1372 | 1779 | 95 | 6.0 |
| 4 | 1631 | 1427 | 1877 | 67 | 4.1 |
| 5 | 4021 | 3305 | 4369 | 233 | 5.8 |
| 6 | 3267 | 3007 | 3559 | 99 | 3.0 |

These results show that:

- an extruded electrically insulating layer increases the voltage at which partial discharges occur (comparison of Example 4 with Examples 2 and 3);
- increasing the thickness of the insulation layer increases the voltage at which partial discharges occur (comparison of Example 5 with Example 4); and
- an extruded trilayer insulation system further increases the voltage at which partial discharges occur (comparison of Example 1 with Example 6).

The cable 10 according to the invention makes it possible to increase the voltage to a value of at least 10 kV without partial discharges occurring.

The invention claimed is:

1. An insulated electrically conductive element for the aerospace field, comprising:

an elongate electrically conductive element surrounded by at least three layers, said three layers being an electrically insulating layer surrounding the elongate electrically conductive element;

a first semiconductor layer of a thickness $e_1$ surrounding said electrically insulating layer; and a second semiconductor layer of a thickness $e_2$ surrounding said electrically conductive element, at least one of said three layers comprising at least one fluoropolymer, wherein said electrically insulating layer has a thickness $e_i$, the value of said thickness $e_i$ being determined according to the operating voltage U of the insulated electrically conductive element, the value of the electric field $e_{max}$, and an inner diameter d1 of the electrically insulating layer, wherein the thickness $e_i$ of the insulating layer is determined according to a ratio of the operating voltage U to the diameter d1, such that the thickness $e_i$ simultaneously satisfies the following relationship:

$$ei \ge \frac{d_1}{2}\left[\exp\left(\frac{U}{E_{max}\times\frac{d_1}{2}}\right)-1\right]$$

and the thickness ei≥e1+e2.

2. The element according to claim 1, wherein at least two of the three layers surrounding the electrically conductive element comprise at least one fluoropolymer.

3. The element according to claim 1, wherein each of the three layers comprises at least one fluoropolymer, preferably the same fluoropolymer.

4. The element according to claim 1, wherein the fluoropolymer is chosen from polytetrafluoroethylene (PTFE), fluorinated ethylene propylene (FEP) copolymers, perfluoroalkoxy alkane (PFA) copolymers, perfluoromethoxy alkane (MFA) copolymers, ethylene tetrafluoroethylene (ETFE), and one of the mixtures thereof.

5. The element according to claim 1, wherein the fluoropolymer is chosen from perfluoroalkoxy alkane (PFA) copolymers.

6. The element according to claim 1, wherein each of the three layers comprises at least one perfluoroalkoxy alkane (PFA) copolymer.

7. The element according to claim 1, wherein said electrically conductive element withstands temperatures ranging from −70° C. to 250° C.

8. The element according to claim 1, wherein said electrically conductive element withstands an electric field E ranging from 1 kV/mm to 30 kV/mm.

9. The element according to claim 1, wherein the electrically insulating layer has a thickness $e_i$, the value of said thickness $e_i$ being determined according to the operating voltage U of the insulated electrically conductive element and an inner diameter $d_1$ of the electrically insulating layer.

10. The element according to claim 1, wherein the minimum value of the thickness $e_i$ expressed in millimetres (mm) is determined according to a following relationship R1:

$$R1 = \frac{U}{E_{max} \times \frac{d_1}{2}}.$$

11. The element according to claim 1, wherein the maximum value of the thickness $e_i$ is determined according to a following relationship R2:

$$R2 = \frac{3 \times U}{E_{max} \times \frac{d_1}{2}}.$$

12. An electrically conductive cable, said electrically conductive cable comprising: at least one insulated electrically conductive element according to claim 1.

* * * * *